United States Patent [19]

Sasaki et al.

[11] Patent Number: 5,324,121
[45] Date of Patent: Jun. 28, 1994

[54] RECORDING DENSITY CORRECTING DEVICE BASED ON GLAZE LAYER THICKNESS OF THERMAL HEAD

[75] Inventors: Eiichi Sasaki, Sagamihara; Keiichi Setani, Tsukui, both of Japan

[73] Assignee: Ricoh Company, Ltd., Tokyo, Japan

[21] Appl. No.: 11,156

[22] Filed: Jan. 29, 1993

[30] Foreign Application Priority Data

Jan. 31, 1992 [JP] Japan .................................. 4-46049

[51] Int. Cl.⁵ .................................. B41J 2/36
[52] U.S. Cl. .................................. 400/120; 346/76 PH
[58] Field of Search .................... 700/120; 346/76 PH

[56] References Cited

FOREIGN PATENT DOCUMENTS 310971 12/1989 Japan .................................. 400/120
299862 12/1990 Japan .................................. 400/120

Primary Examiner—David A. Wiecking
Assistant Examiner—Steven S. Kelley
Attorney, Agent, or Firm—Oblon, Spivak, McClelland, Maier & Neustadt

[57] ABSTRACT

A device for correcting the recording density of a recording apparatus having a thermal head implemented as an array of a plurality of elements. The device corrects energy to be applied to the head on the basis of the resistance of each element and thickness data associated with a glaze layer.

7 Claims, 10 Drawing Sheets

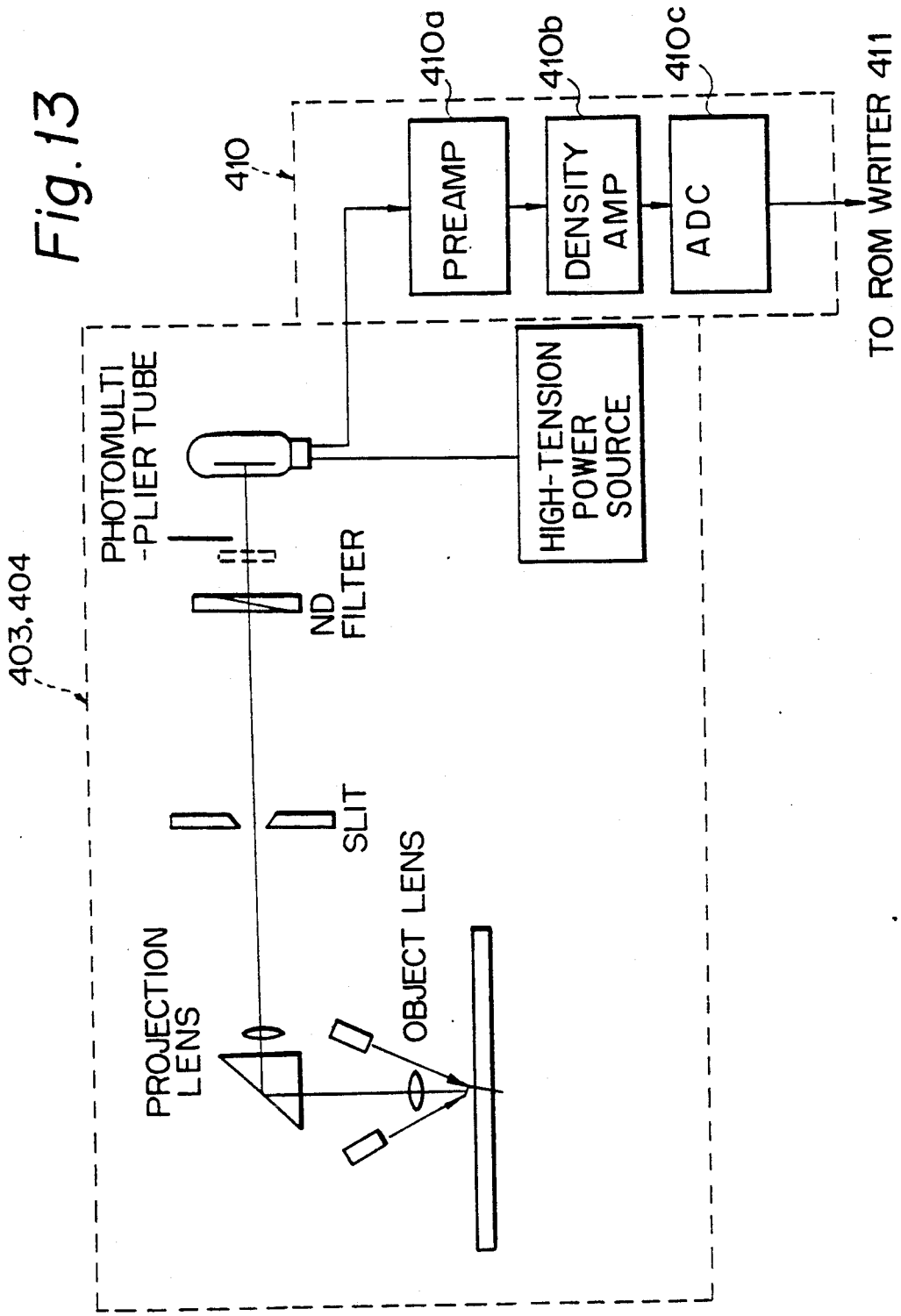

RECORDING DENSITY CORRECTING DEVICE BASED ON GLAZE LAYER THICKNESS OF THERMAL HEAD

BACKGROUND OF THE INVENTION

The present invention relates to a device for correcting the recording density of a recording device having a thermal head implemented as an array of a plurality of elements.

A recording density correcting device for the above application is disclosed in, for example, Japanese Patent Laid-Open Publication No. 201876/1984. The device disclosed in this prior art has resistance measuring means for measuring the resistance of each element of the head beforehand, and heat control means for controlling heat to be generated on the basis of the resistance. Specifically, paying attention to irregularities in the resistance of the element, the device controls a current so as to cause all of the elements to generate the same amount of heat. Further, since the device measures the resistance element by element at a predetermined time, it allows all the elements to generate uniform heat despite the resistance which varies due to aging. Another type of recording density correcting device proposed in the past measures print sample densities and controls head in matching relation to the element-by-element density.

However, the problem with the device taught in the above Laid-Open Publication is that the thickness of a glaze layer provided on the head is not uniform throughout the elements. In actual printing, even if the current is so controlled as to cause the elements to generate the same amount of heat, the thermal efficiency for coloring differs from one element to another due to the irregular thickness distribution of the glaze layer. Hence, the resulting print density is not always uniform. Stated another way, since the print density noticeably changes depending on the thickness of the glaze layer, simply correcting the irregularities in the resistance of the element cannot provide a solid image with satisfactory uniform density.

While the above problem will, of course, be eliminated if a thermal head whose glaze layer has a substantially uniform thickness is used, such a head is not practical from the yield standpoint, i.e., the cost standpoint.

The conventional device of the type measuring the print sample density promotes accurate correction since the print sample density suffered from the irregular thickness of the glaze layer is measured and then fed back to the print density. However, since the resistance of each element changes due to aging, correction data have to be sampled at a predetermined period.

SUMMARY OF THE INVENTION

It is, therefore, an object of the present invention to provide a recording density correcting device for a recording apparatus with a thermal head which corrects changes in density ascribable to the irregular thickness of a glaze layer and automatically copes with changes in the resistance of elements due to aging.

In accordance with the present invention, a device for correcting recording density of a recording apparatus having a thermal head implemented as an array of a plurality of elements comprises a resistance detecting section for detecting the resistance of each of the plurality of elements, a storage device for storing thickness data of a glaze layer measured beforehand, and a controller for correcting energy to be applied to the thermal head on the basis of the resistance detected by the resistance detecting section and the thickness data stored in the storage.

Also, in accordance with the present invention, a device for correcting recording density of a recording apparatus having a thermal head implemented as an array of a plurality of elements comprises a resistance detecting section for detecting the resistance of each of the plurality of elements, a storage storing correction data generated by extracting a factor other than the resistance, and a controller for correcting energy to be applied to the thermal head on the basis of the resistance detected by the resistance detecting section and the correction data stored in the storage.

BRIEF DESCRIPTION OF THE DRAWINGS

The above and other objects, features and advantages of the present invention will become more apparent from the following detailed description taken with the accompanying drawings in which:

FIG. 13 shows a relation between spotlights, a light-sensitive section, and a density measuring section.

DESCRIPTION OF THE PREFERRED EMBODIMENTS

Figure 1:
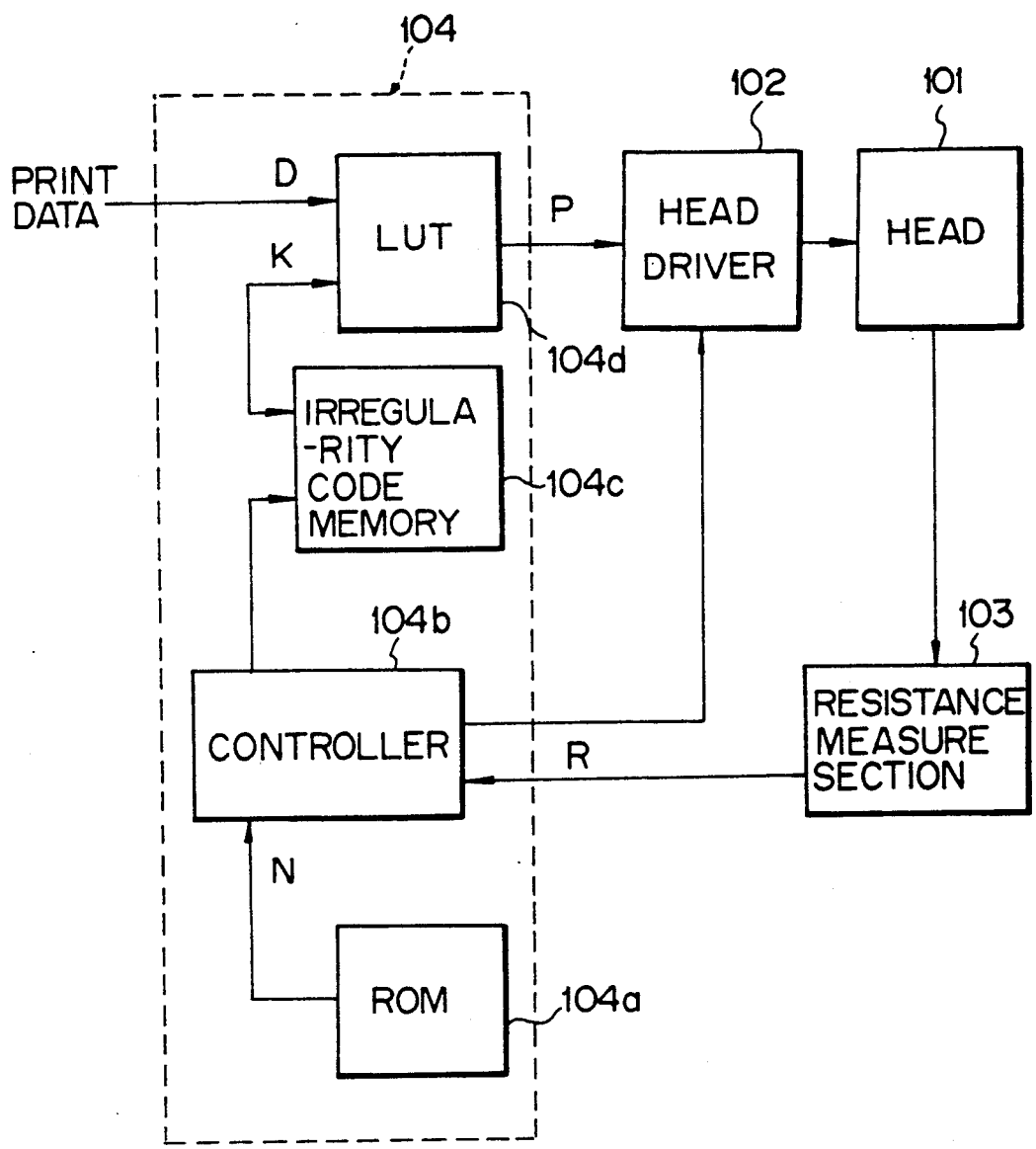
FIG. 1 is a block diagram schematically showing a control system representative of a recording density correcting device embodying the present invention.

Referring to FIG. 1 of the drawings, a recording density correcting device embodying the present invention is shown which controls a thermal head 101. As shown, the device is made up of a head driver 102, a resistance measuring section 103 for measuring the resistance R of each element of the head 101, and a density correcting section 104 for correcting print data D. The density correcting section 104 includes a ROM (Read Only Memory) 104a storing data N representative of irregularities in the thickness of a glaze layer measured beforehand element by element. In response to the irregularity data N, a controller 104b generates an irregularity code K on an element basis. An irregularity code memory 104c stores such irregularity codes generated by the controller 104b. A look-up table (LUT) 104d receives the print data A and the element-by-element irregularity codes K and then produces corrected print data P.

Figure 2A:
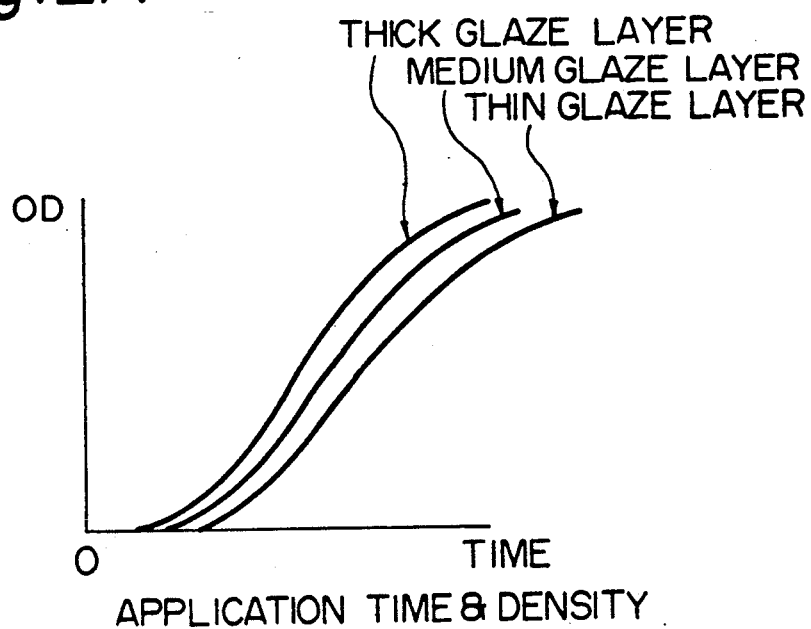
FIGS. 2A and 2B plot respectively a relation between the energy application time and the density with respect to some different thicknesses of a glaze layer, and a relation of the same with respect to some different resistances.
Figure 2B:
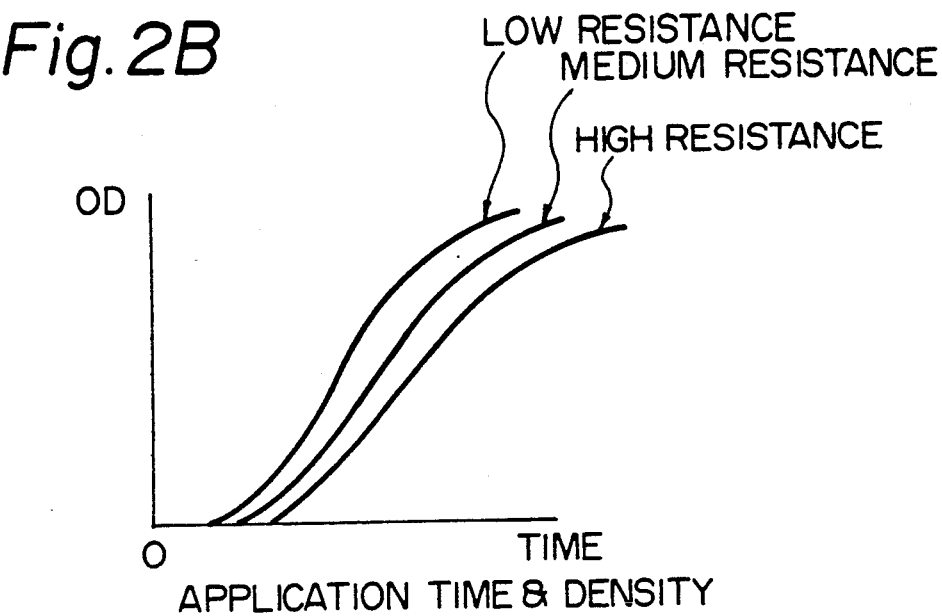

FIG. 2A shows a relation between the energy application time and the recording density with respect to three different thicknesses of glaze layer. As shown, despite that the resistance remains the same, the gradient of gamma changes with the change in the thickness of the glaze layer. FIG. 2A plots a relation between the application time and the recording density with respect to three different resistances. As FIG. 2A indicates, despite that the thickness of the glaze layer is the same, gamma sequentially falls as the resistance increases. In this manner, the thickness of the glaze layer and the resistance are related to the density in the same fashion. The embodiment, therefore, causes the controller 104b to generate an irregularity code K from the resistance R and irregularity data N by using the following equation:

$$K = R * \alpha * N$$

where $\alpha$ is a constant.

Figure 3:
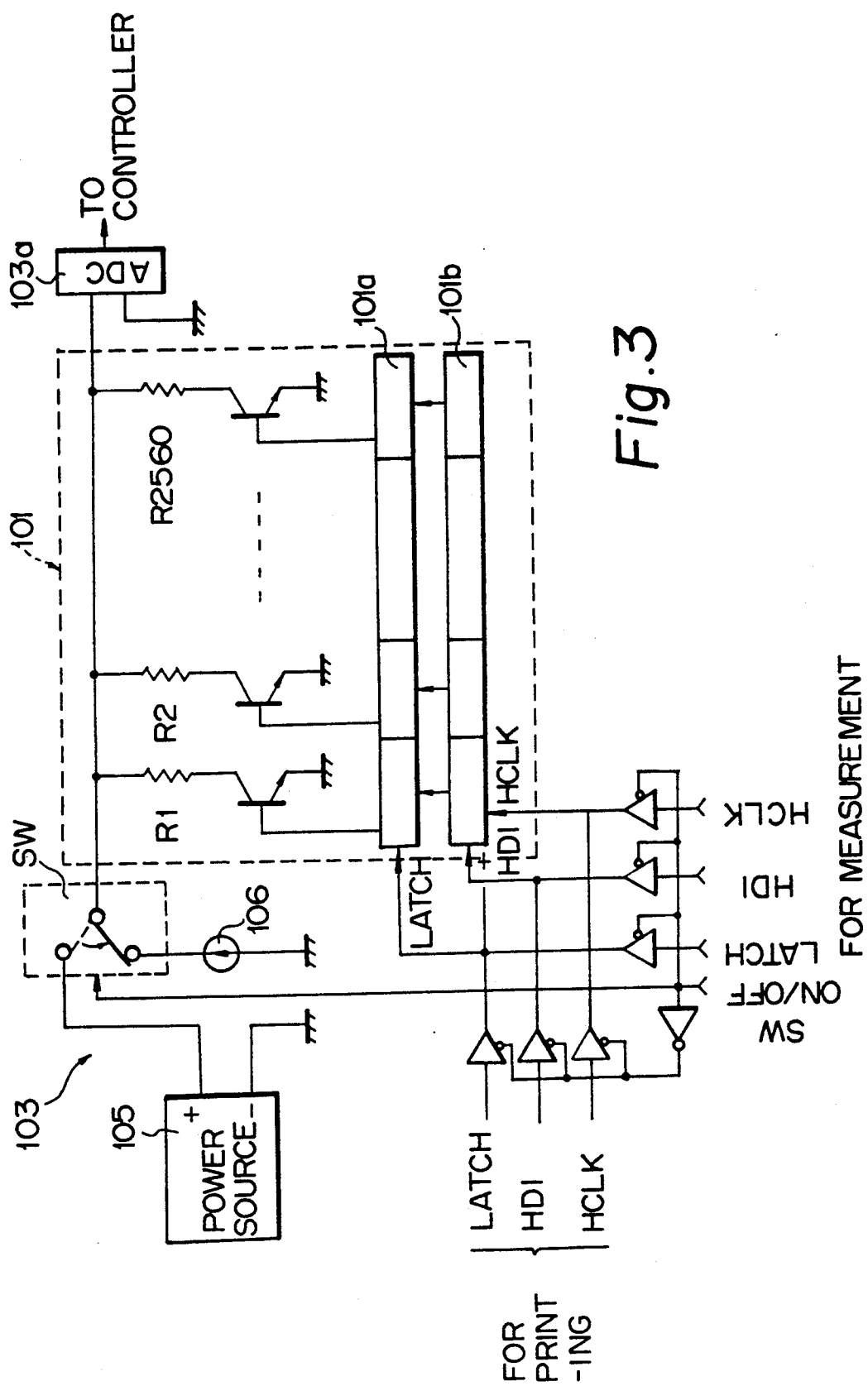
FIG. 3 is a circuit diagram showing a specific construction of a thermal head and resistance measuring section.

FIG. 3 shows a specific construction of the thermal head 101 and resistance measuring section 103. As shown, the head 101 has element resistors R1-R2560, latches 101a associated with the element resistors R1-R2560, and shift registers 101b for sending head data HDI to the latches 101a. The reference numeral 105 designates a power source for printing an image. The resistance measuring section 103 has a constant current power source 106 for measuring a resistance, a switch SW for selecting either of the two power sources 105 and 106, and an analog-to-digital converter (ADC) 103a for detecting a voltage. The head data, a head synchronization clock HCLK and a latch signal LATCH for latching the head data HDI are delivered as head drive signals. Regarding the three head drive signals, in the event of printing an image, head drive signals adapted for printing are fed from the head driver 102 to the head 101 in response to a SW ON/OFF signal. On the other hand, in the event of measuring resistances, head drive signals adapted for measurement are fed from the controller 104b to the head 101.

Figure 4:
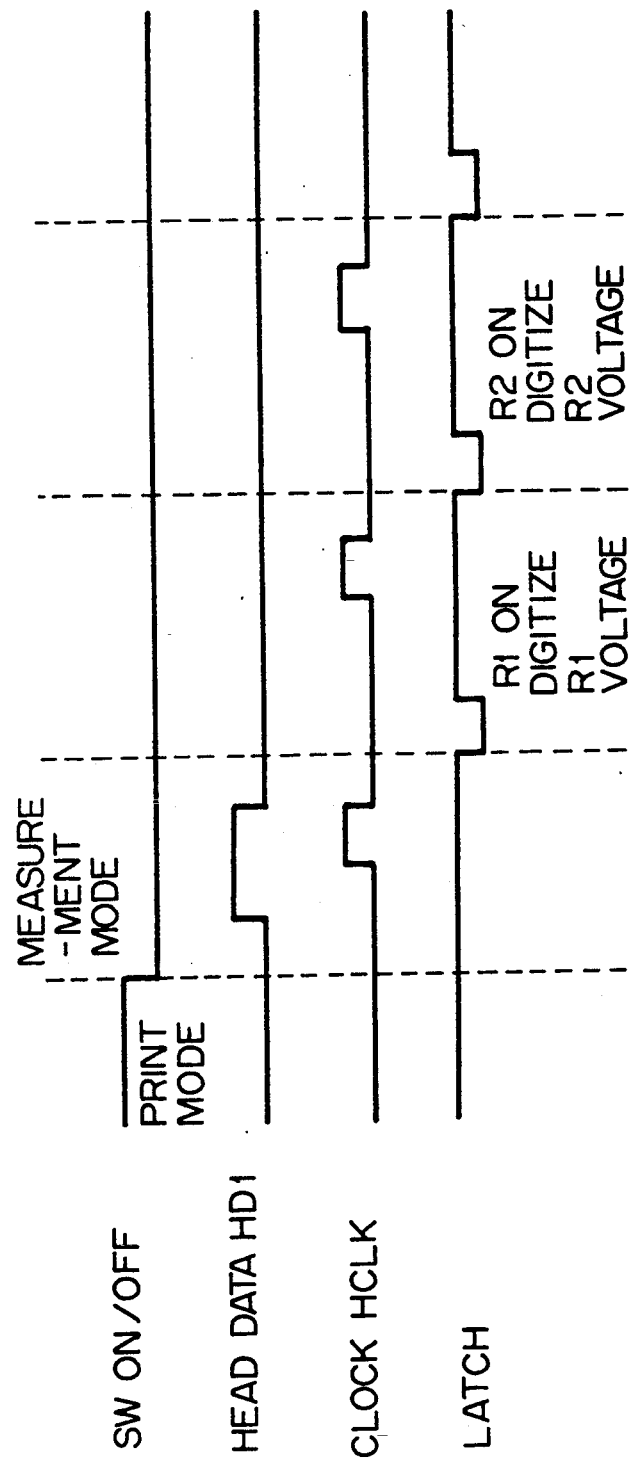
FIG. 4 is a timing chart useful for understanding the operation of the resistance measuring section.

A reference will be made to FIG. 4 for describing the operation of the embodiment. A measurement mode is set up in place of a print mode by the SW ON/OFF signal from the controller 104. The head data HDI is brought to a high level, and one clock pulse HCLK is applied to and stored in one shift register 101b. Then, after the head data HDI is changed to a low level, the latch signal LATCH is changed from a low level to a high level to latch data in one latch 103 paired with the shift register 101b. In this condition, only the element resistor R1 becomes ON with the result that a constant current flows therethrough, whereby a voltage R1*i is generated. This voltage is converted to digital data by the ADC 103a and then fed to the controller 104b. Subsequently, one clock pulse HCLK is applied to read head data HDI of low level. At this instant, the high level data read by the previous step is shifted to the next shift register 101b. Then, the latch signal LATCH is changed from a low level to a high level to latch the content of the shift register 101b of interest in the associated latch 103a. Consequently, only the element resistor R2 becomes ON to cause a current to flow therethrough, thereby generating a voltage R2*i. This voltage is also converted to digital data by the ADC 103a and then sent to the controller 104b. Such an operation is repeated up to the last element resistor R2560 so as to measure the resistances R of all of the elements.

As shown in FIG. 1, as the measured resistances R sequentially arrive at the controller 104b, the controller 104b reads the irregularity data corresponding one-to-one to the elements out of the ROM 104a, generates irregularity codes K by use of the previously stated equation, and then writes them in the irregularity code memory 104c.

As a printing operation begins after the measurement, print data D are sent to the LUT 104d. At the same time, the irregularity codes K each being associated with respective one of the elements are transferred from the memory 104c to the LUT 104d. The content of the LUT 104d is, therefore, a table consisting of the print data D and the irregularity codes K. As a result, corrected print data P corresponding to the print data D and irregularity codes K are outputted from the LUT 104d. The head driver 102 converts the corrected print data P to head drive signals for driving the head 101 (head data HDI, clock HCLK, and head data latch signal LATCH) and then feeds them to the head 101.

As stated above, since the embodiment uses the data N associated with the irregularities in the thickness of glaze layer in correcting the recording density, it eliminates changes in the print density ascribable to such irregularities. This insures a solid image having a uniform density over the entire area. In addition, since the embodiment measures the resistances R of the elements by the measuring section 103 before a printing operation, it also eliminates an irregular density distribution ascribable to the resistances R which vary due to aging.

Figure 5:
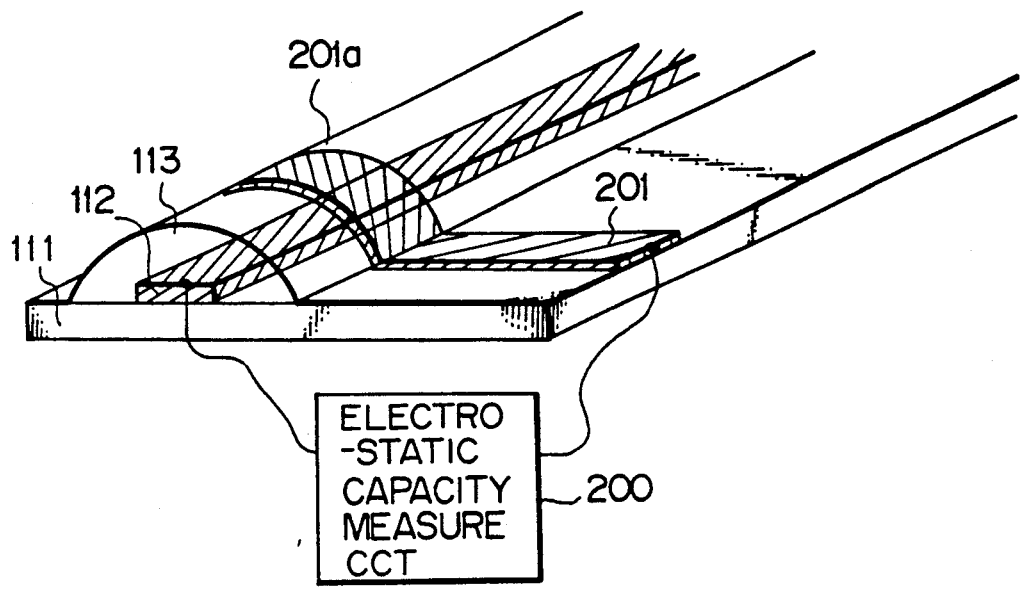
FIG. 5 shows a specific arrangement for producing irregularity data N associated with the glaze layer.

Generally, it is not easy to measure irregularities in the thickness of the glaze layer of the head 101. In the illustrative embodiment, as shown in FIG. 5, the head 101 is provided with a conductor 112 between a ceramic portion 111 and a glaze layer 113. An electrostatic capacity measuring circuit 200 is connected at one end to the conductor 112 and at the other end to an element 201a via a conductor 201. In this condition, the electrostatic capacity between the conductor 112 and the element 201a is measured to determine a thickness of the glaze layer 113. With this arrangement, it is possible to produce irregularity data N with ease.

Figure 6:
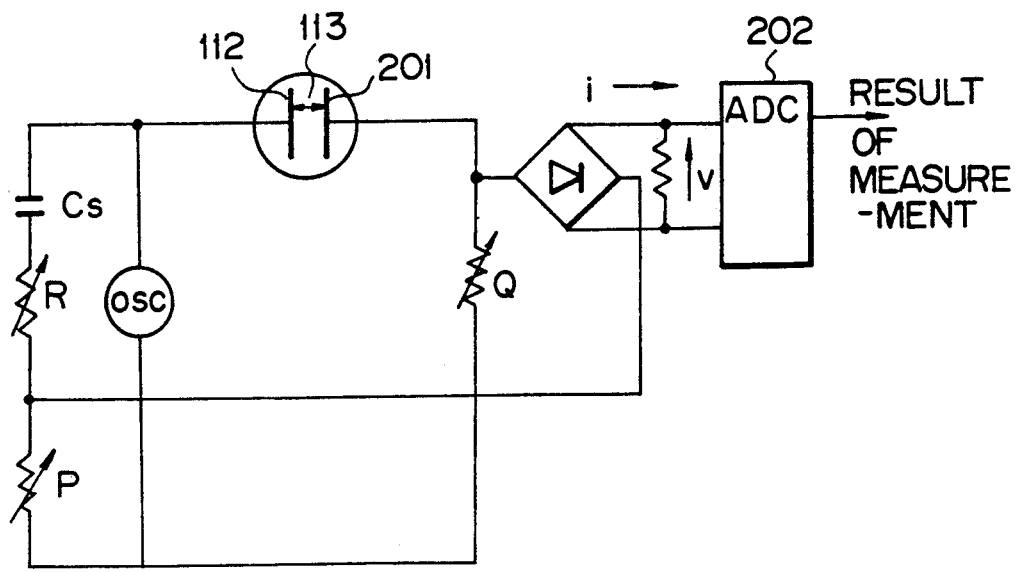
FIG. 6 is a circuit diagram showing an electrostatic capacity measuring circuit.

FIG. 6 shows a specific construction of the electrostatic capacity measuring circuit 200. As shown, the circuit 200 has proportional resistors P and Q, a variable resistor R, a reference capacitor Cs, and an oscillator OSC. The conductor 112, glaze layer 113 and conductor 201 constitute a capacitor to be measured. In response to an AC signal from the oscillator OSC, a current is generated on the basis of the balance of the resistors P and Q, capacitor Cs, and subject capacitor (112, 113 and 210). The resulting voltage v is digitized by an ADC 202 and then delivered as a result of measurement.

Figure 7:
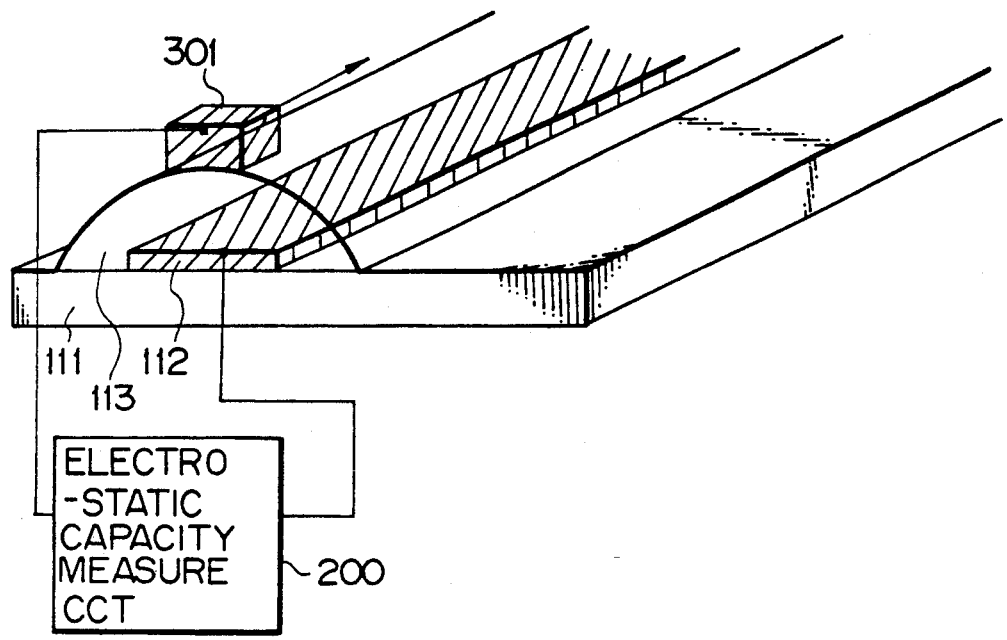
FIGS. 7, 8 and 9 each shows another specific arrangement for producing the irregularity data N.

FIG. 7 shows another specific arrangement for measurement which uses a conductor electrode 301. As shown, the conductor electrode 301 is moved at a pitch corresponding to a single element, as indicated by an arrow in the figure. This is also successful in producing irregularity data N in terms of electrostatic capacity.

Figure 8:
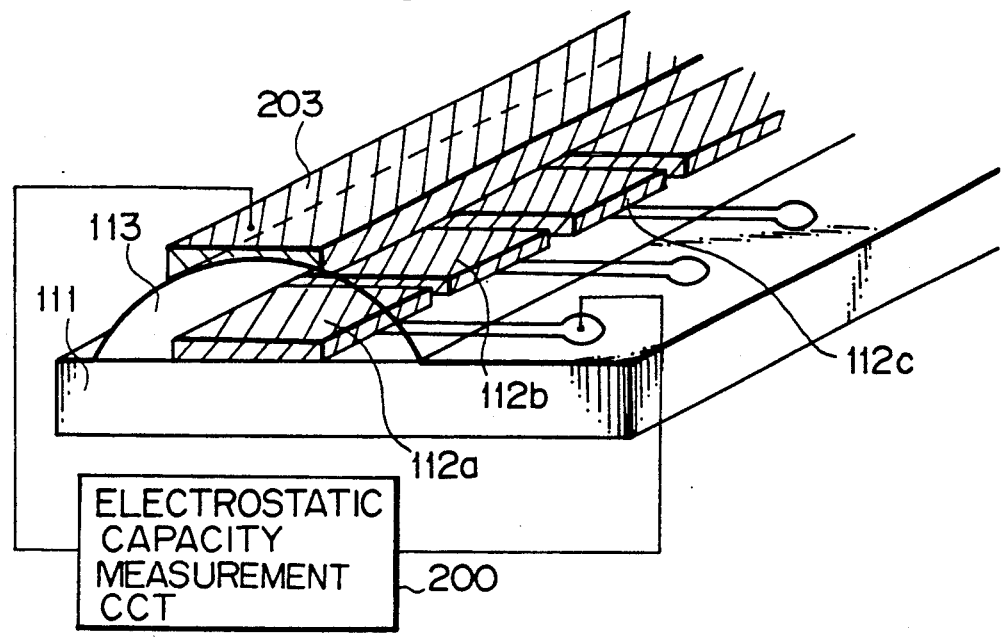

FIG. 8 shows another specific arrangement for measurement which uses a conductor 203. As shown, the head 101 has between the ceramic portion 111 and the glaze layer 113 thereof conductors 112a, 112b, 112c and so forth each corresponding to a single element. The measuring circuit 200 is connected at one end to one conductor 112 at a time and at the other end to the conductor 203.

Figure 9:
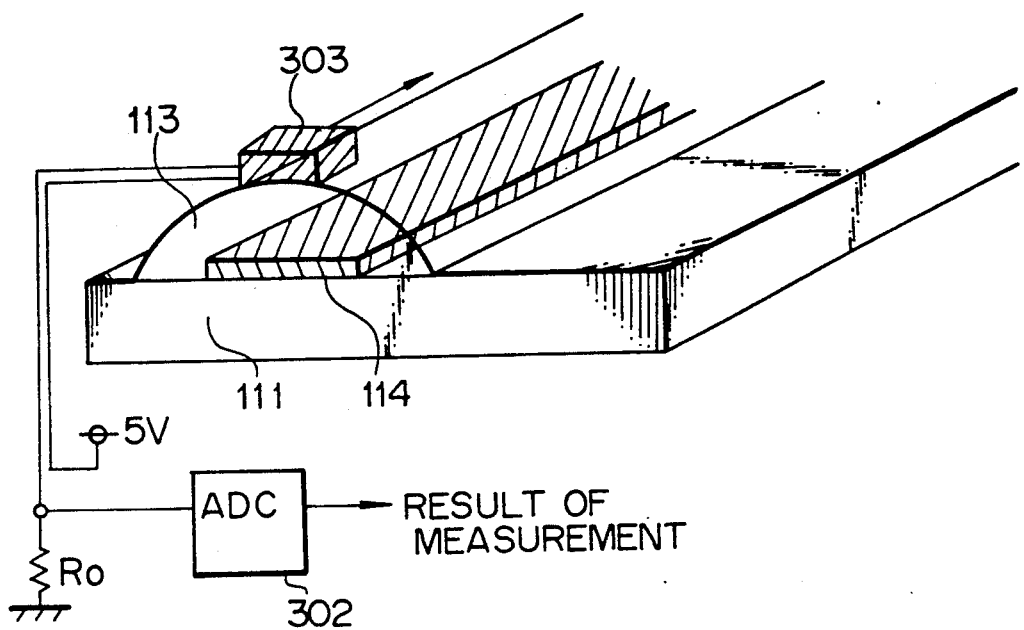

FIG. 9 shows still another specific arrangement for measurement which uses a heater 114. As shown, the heater is interposed between the ceramic portion 111 and the glaze layer 113 of the head 101 and generates heat uniformly. A thermistor 303 is serially connected to a reference resistor Ro and located on the surface of the head 101. A voltage of 5 volts is applied to the thermistor 303. The resistance of the thermistor 303 changes with temperature. The resulting divided voltage is digitized by an ADC 302 and then measured to produce data N.

An alternative embodiment of the present invention will be described in which the ROM 104a, FIG. 1, stores correction data M in place of the irregularity data N. To produce the correction data M, the densities of an image recorded by correcting energy to be applied on the basis of resistances detected by predetermined detecting means are measured. Then, the measured densities or density data are converted to digital signals. For this purpose, the recording density correcting section 104 is made up of the ROM 104a storing the correction data M, the controller 104b for generating the irregularity code K element by element on the basis of the resistance R fed from the resistance measuring section 103 and correction data M, the irregularity code memory 104c for storing the irregularity codes K, and the LUT 104d for receiving the print data D and codes K and delivering the corrected print data P.

The operation of the alternative embodiment will not be described specifically since it is essentially similar to the operation of the previous embodiment. By using the correction data M, the embodiment eliminates changes in the print density ascribable to such irregularities. This insures a solid image having a uniform density over the entire area thereof. In addition, since the embodiment measures the resistances R of the elements, it also eliminates an irregular density distribution ascribable to the resistances R which vary due to aging.

Figure 10:
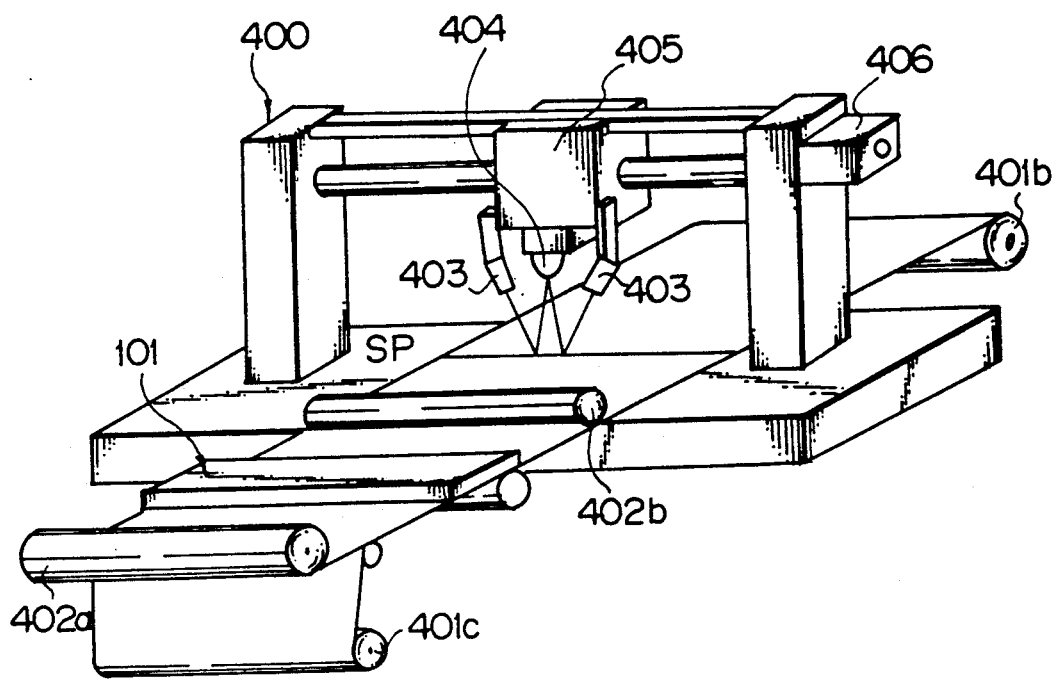
FIG. 10 is a perspective view of a specific device for producing correction data M.

FIG. 10 shows a specific arrangement for producing the correction data M which characterizes this embodiment, i.e., a recording density measuring device 400. As shown, the head 101 is set on the measuring device 400 to produce the correction data M before it is mounted on a recording device. The measuring device 400 has a feed roll 401a for paying out a webbing or paper for recording an image, a take-up roll 401b for taking up the paper, a roll 402a for paying out an ink sheet, a take-up roll 402b for taking up the ink sheet, spotlights 403 for measuring the density of an image recorded on the paper, a light-sensitive section 404, a scanning unit 405 carrying the spotlights 403 and light-sensitive section 404 and movable along a scanning point SP, and a stepping motor 406 for driving the scanning unit 405.

Figure 11:
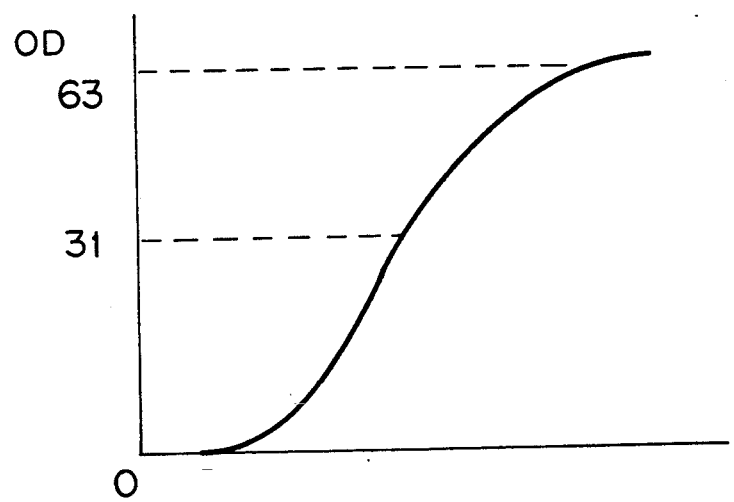
FIG. 11 shows a curve representative of a characteristic of a sublimation type ink sheet.

The ink sheet is implemented as a sublimation type ink sheet. As shown in FIG. 11, this type of ink sheet is inherently easy to render halftone in association with applied energy.

Figure 12:
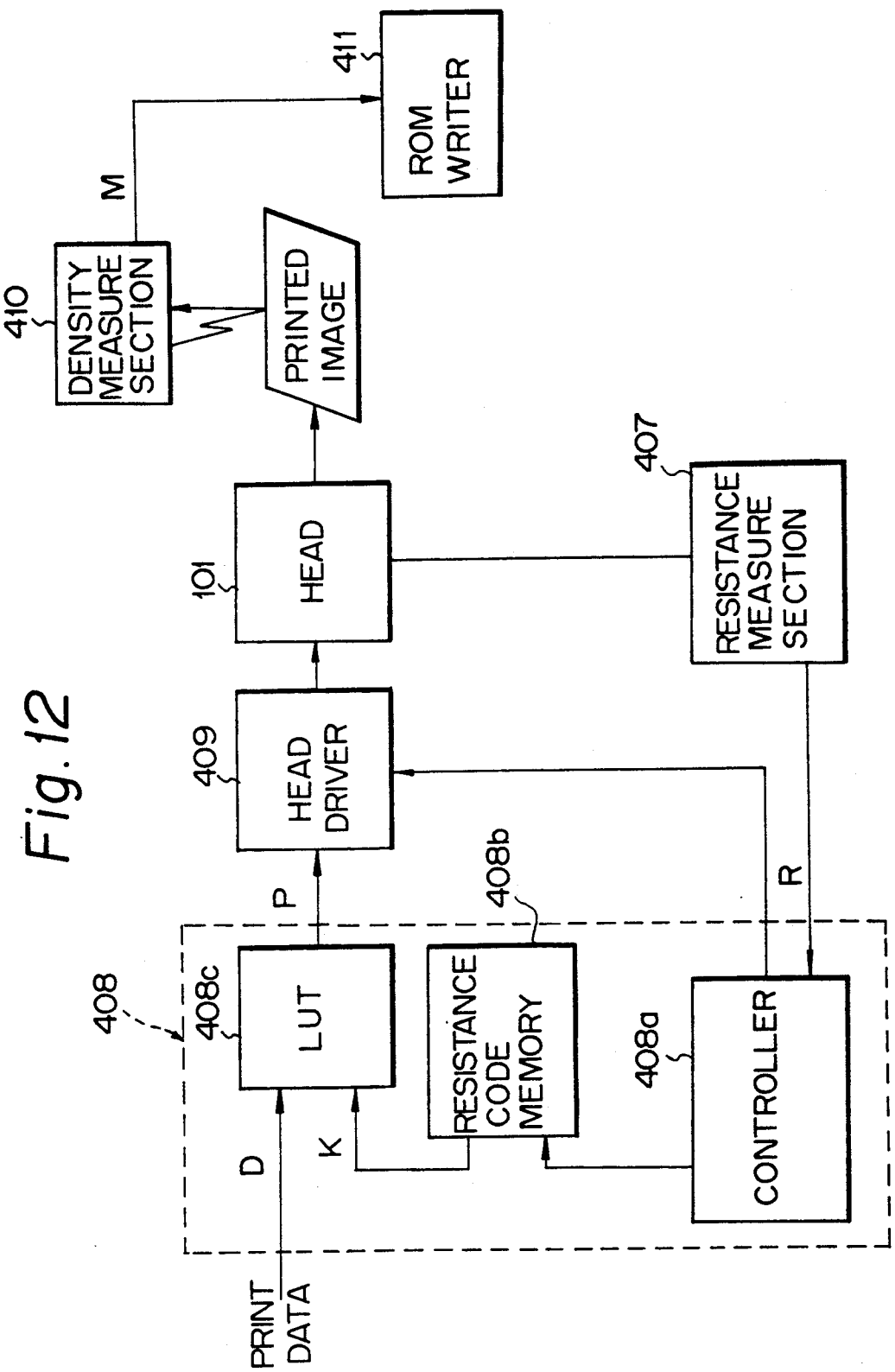
FIG. 12 is a block diagram schematically showing a recording density measuring device.

FIG. 12 shows a system for controlling the measuring device 400. As shown, the control system has a head driver 409 for driving the head 101, a resistance measuring section 407 for measuring the resistance R element by element, and a recording density correcting section 408 for correcting print data D. in the correcting section 408, a controller 408a generates a resistance code K element by element based on a resistance R from the measuring section 407. The controller 408a writes the resistance code K in a resistance code memory 408b. An LUT 408c receives the print data D and the element-by-element resistance code K and produces the resulting corrected print data P. Also shown in FIG. 12 are a density measuring section 410 for measuring the density of the image printed by the head 101, and a ROM writer 411 for writing the correction data M from the measuring section 410 in a predetermined ROM, not shown.

FIG. 13 shows a relation of the spotlights 403, light-sensitive section 404, and density measuring section 410. As the spotlights 403 illuminate an image printed on the paper, the resulting reflection is routed through an object lens, projection lens, slit and ND filter to a photomultiplier tube. A change in the quantity of light incident to the photomultiplier tube is amplified by a preamplifier 410a included in the measuring section 410. Then, the optical amount of reflection is logarithmically converted to a density. Subsequently, the density is digitized by an ADC 410c, sent to the ROM writer 411, and then written to the ROM as a digital code (correction data M). In this embodiment the ROM storing such correction data M is used as the ROM 104a incorporated in the image density correcting section 104.

In summary, it will be seen that the present invention provides a recording density correcting device capable of correcting density effected by irregularities in the thickness of a glaze layer of a thermal head and, at the same time, automatically coping with the resistance of each element which varies due to aging.

Various modifications will become possible for those skilled in the art after receiving the teachings of the present disclosure without departing from the scope thereof.

What is claimed is:

1. A device for correcting recording density of a recording apparatus having a thermal head implemented as an array of a plurality of elements, said device comprising:

resistance detecting means for detecting a resistance of each of the plurality of elements;

storing means storing thickness data of a glaze layer of said thermal measured beforehand; and control means for correcting energy to be applied to the thermal head on the basis of the resistance detected by said resistance detecting means and the thickness data stored in said storing means.

2. An apparatus for printing using a thermal head having a conductor and a glaze layer disposed on the conductor, comprising:

storage means for storing data indicating a thickness of said glaze layer;

control means for controlling energy applied to said thermal head using said stored data, an amount of energy applied to said thermal head controlling a print density produced by said thermal head.

3. An apparatus according to claim 2, further comprising:

resistance detecting means for detecting a resistance of a plurality of elements making up said conductor;

wherein said control means controls the energy applied to said thermal head using both said stored data indicating a thickness of said glaze layer and the detected resistance.

4. An apparatus according to claim 2, further comprising an electrostatic capacity measuring circuit which determines an electrostatic capacity between said conductor and a measuring element disposed on said glaze layer to generate said data indicating a thickness of said glaze layer.

5. An apparatus for printing, comprising:
   a thermal head having a conductor and a glaze layer disposed on the conductor;
   storage means for storing data indicating a thickness of said glaze layer;
   control means for controlling energy applied to said thermal head using said stored data, an amount of energy applied to said thermal head controlling a print density produced by said thermal head.

6. An apparatus according to claim 5, further comprising:
   resistance detecting means for detecting a resistance of a plurality of elements making up said conductor;
   wherein said control means controls the energy applied to said thermal head using both said stored data indicating a thickness of said glaze layer and the detected resistance.

7. An apparatus according to claim 5, further comprising an electrostatic capacity measuring circuit which determines an electrostatic capacity between said conductor and a measuring element disposed on said glaze layer to generate said data indicating a thickness of said glaze layer.

* * * * *